(12) United States Patent
Price et al.

(10) Patent No.: US 11,913,573 B2
(45) Date of Patent: Feb. 27, 2024

(54) RADIO-FREQUENCY IDENTIFICATION CONNECTOR

(71) Applicant: Oetiker NY, Inc., Lancaster, NY (US)

(72) Inventors: Martin R. Price, Buffalo, NY (US); Kristian James Hagen, Gasport, NY (US); Kari Ann Sausen, Clarence, NY (US)

(73) Assignee: Oetiker NY, Inc., Lancaster, NY (US)

(*) Notice: Subject to any disclaimer, the term of this patent is extended or adjusted under 35 U.S.C. 154(b) by 195 days.

(21) Appl. No.: 17/635,237

(22) PCT Filed: Jun. 15, 2020

(86) PCT No.: PCT/US2020/037760
§ 371 (c)(1),
(2) Date: Feb. 14, 2022

(87) PCT Pub. No.: WO2021/066896
PCT Pub. Date: Apr. 8, 2021

(65) Prior Publication Data
US 2022/0292325 A1 Sep. 15, 2022

Related U.S. Application Data

(60) Provisional application No. 62/907,758, filed on Sep. 30, 2019.

(51) Int. Cl.
| F16L 23/00 | (2006.01) |
| F16L 23/036 | (2006.01) |
| F16L 23/10 | (2006.01) |
| G06K 19/077 | (2006.01) |

(52) U.S. Cl.
CPC .......... *F16L 23/006* (2013.01); *F16L 23/036* (2013.01); *F16L 23/10* (2013.01); *G06K 19/07758* (2013.01); *G06K 19/07798* (2013.01); *F16L 2201/10* (2013.01); *F16L 2201/60* (2013.01)

(58) Field of Classification Search
None
See application file for complete search history.

(56) References Cited

U.S. PATENT DOCUMENTS

| 2,941,823 A | 6/1960 | Good |
| 7,854,623 B2 | 12/2010 | Radenne et al. |
| 8,746,041 B2 | 6/2014 | Howard et al. |

(Continued)

FOREIGN PATENT DOCUMENTS

| CN | 204360938 | 5/2015 |
| CN | 204927088 | 12/2015 |

(Continued)

*Primary Examiner* — Thomas S McCormack
(74) *Attorney, Agent, or Firm* — Harter Secrest & Emery LLP; Michael Nicholas Vranjes (57) ABSTRACT

A radio-frequency identification (RFID) connector, including a connector, including at least one component, and a RFID assembly connected to the connector, the RFID assembly including a RFID tag, and at least one contact arranged on the at least one component and electrically connected to the RFID tag, wherein in an unlocked state of the RFID connector, the RFID tag indicates an open state of the RFID assembly, and in a locked state of the RFID connector, the RFID tag indicates a closed state of the RFID assembly.

20 Claims, 6 Drawing Sheets

(56) References Cited

U.S. PATENT DOCUMENTS

| | | | |
|---|---|---|---|
| 8,857,723 | B2 | 10/2014 | Kotyrba |
| 9,080,922 | B2 | 7/2015 | Howard et al. |
| 2018/0009174 | A1 | 1/2018 | Mencos |
| 2018/0266602 | A1 | 9/2018 | Fremont |
| 2019/0049049 | A1 | 2/2019 | Ignaczak et al. |
| 2019/0257456 | A1* | 8/2019 | Ignaczak ............... F16L 37/133 |

FOREIGN PATENT DOCUMENTS

| | | |
|---|---|---|
| CN | 105910529 | 8/2016 |
| DE | 202004002116 U1 | 6/2004 |
| EP | 1772659 A2 | 4/2007 |
| EP | 3249634 A1 | 11/2017 |
| EP | 3544114 A1 | 9/2019 |
| JP | 2005315653 | 11/2005 |
| JP | 2013131092 | 7/2013 |
| JP | 3217688 | 8/2018 |
| WO | WO2010132572 A1 | 11/2010 |
| WO | WO2014031008 A1 | 2/2014 |

* cited by examiner

RADIO-FREQUENCY IDENTIFICATION CONNECTOR

CROSS-REFERENCE TO RELATED APPLICATIONS

The present application is the U.S. National Stage Application pursuant to 35 U.S.C. § 371 of International Patent Application No. PCT/US2020/037760, filed on Jun. 15, 2020, which application claims the benefit of U.S. Provisional Patent Application No. 62/907,758, filed on Sep. 30, 2019, which applications are hereby incorporated by reference in their entireties.

FIELD

The present disclosure relates to a connection verifier for a clamp, and, more particularly, to a clamp or connector comprising a radio-frequency identification (RFID) tag that indicates the status of the clamp or a connection via wireless transmission.

BACKGROUND

A clamp is a fastening device used to hold or secure objects tightly together to prevent movement or separation through the application of inward pressure. There are many types of clamps available for many different purposes. Some are temporary, as used to position components while fixing them together, others are intended to be permanent.

One type of clamp, known as a hose clamp or hose clip or hose lock, is a device used to attach and seal a hose into a fitting such as a barb or nipple. Some types of hose clamps include screw/band (worm gear) clamps, spring clamps, wire clamps, ear clamps, v clamps, etc. Often, hose clamps are used to connect hoses or lines to fittings that carry toxic substances, such as refrigerant, fuel, oil, coolant, etc., and are thus a crucial component. As such, it is essential that the clamp or connector be properly secured thereby properly securing the connection (i.e., the hose/fitting connection).

It should be appreciated that clamps or connectors are crucial components of many other connectors and their use does not extend to only fluid connections. For example, clamps may be used in the medical field to secure components various tools or machines during surgical or non-surgical procedures. Clamps or connectors may be used to secure moving bodies together, for example, a trailer to a vehicle.

As such, there is a long-felt need for a connection verifier that ensures that a connection, connector, or clamp is adequately secured. There has also been a long-felt need for a connection verifier that utilizes RFID to ensure that a connection between various components is securely connected.

SUMMARY

According to aspects illustrated herein, there is provided a radio-frequency identification (RFID) connector, comprising a connector, including at least one component, and a RFID assembly connected to the connector, the RFID assembly including a RFID tag, and at least one contact arranged on the at least one component and electrically connected to the RFID tag, wherein in an unlocked state of the RFID connector, the RFID tag indicates an open state of the RFID assembly, and in a locked state of the RFID connector, the RFID tag indicates a closed state of the RFID assembly.

In some embodiments, the at least one component comprises a first component including a first end and a second end, and a second component, wherein the at least one contact is arranged on the second component. In some embodiments, in the unlocked state, the first component is not engaged with the at least one contact, and in the locked state, the first component is engaged with the at least one contact. In some embodiments, the first component is an outer ring including an inward facing surface, and the second component is connected to the inward facing surface and includes an outward facing surface, the at least one contact being arranged on the outward facing surface. In some embodiments, the second component comprises one or more segments. In some embodiments, the at least one contact comprises a first contact electrically connected to the at least one component, and a second contact. In some embodiments, in the unlocked state, the second contact is not electrically connected to the at least one component, and in the locked state, the second contact is electrically connected to the at least one component. In some embodiments, the at least one contact comprises a pressure sensitive contact. In some embodiments, the at least one contact comprises a first contact electrically connected to the RFID tag, and a second contact electrically connected to the RFID tag, the second contact being separated from the first contact to form the open state. In some embodiments, in the closed state, the first contact is electrically connected to the second contact. In some embodiments, the RFID tag comprises an antenna, in an open state of the RFID tag, the antenna circuit is open, and in a closed state of the RFID tag, the antenna circuit is closed.

According to aspects illustrated herein, there is provided a radio-frequency identification (RFID) connector, comprising a connector, including a first component comprising an inward facing surface, a first end, and a second end, and a second component comprising an outward facing surface, the second component connected to the first component, and a RFID assembly, including a RFID tag, a first contact electrically connected to the RFID tag and the second component, and a second contact electrically connected to the RFID tag and arranged on the outward facing surface, wherein in an unlocked state of the RFID connector, the second contact is not electrically connected to the first component, and in a locked state of the RFID connector, the second contact is electrically connected to the first component.

In some embodiments, in the unlocked state, the RFID tag indicates an open state of the RFID assembly, and in the locked state, the RFID tag indicates a closed stat of the RFID assembly. In some embodiments, the second end is operatively arranged to displace relative to the first end to tighten the connector, and removably engage and electrically connect to the second contact. In some embodiments, the connector is a clamp. In some embodiments, the RFID assembly further comprises a layer, the layer comprising a top surface, wherein the second contact and the RFID tag are arranged on the top surface, and a bottom surface. In some embodiments, the layer comprises an insulating material and the bottom surface is connected to the outward facing surface. In some embodiments, the first contact is arranged on the bottom surface. In some embodiments, the RFID tag comprises an antenna, in the open state, the antenna circuit is open, and in the closed state, the antenna circuit is closed.

According to aspects illustrated herein, there is provided a radio-frequency identification (RFID) connector, comprising a connector, including an outer ring comprising an inward facing surface, a first end, and a second end, the second end being displaceable relative to the first end, and an inner ring component comprising an outward facing surface, the inner ring component connected to the outer ring, and a RFID assembly arranged on the outward facing surface, the RFID assembly including a RFID tag, a first contact electrically connected to the RFID tag and the outer ring, and a second contact electrically connected to the RFID tag, wherein in an unlocked state of the RFID connector, the second contact is not electrically connected to the outer ring and the RFID tag indicates an open state of the RFID assembly, and in a locked state of the RFID connector, the second contact is electrically connected to the outer ring and the RFID tag indicates a closed state of the RFID assembly.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

Figure 1:
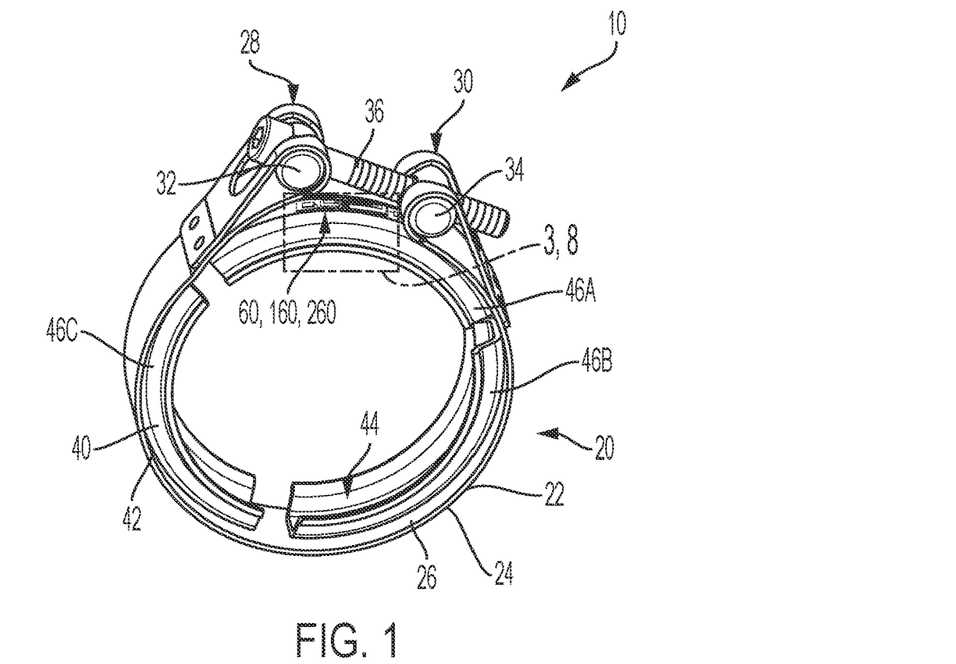
FIG. 1 is a perspective view of a RFID connector, in an unlocked state.
Figure 2:
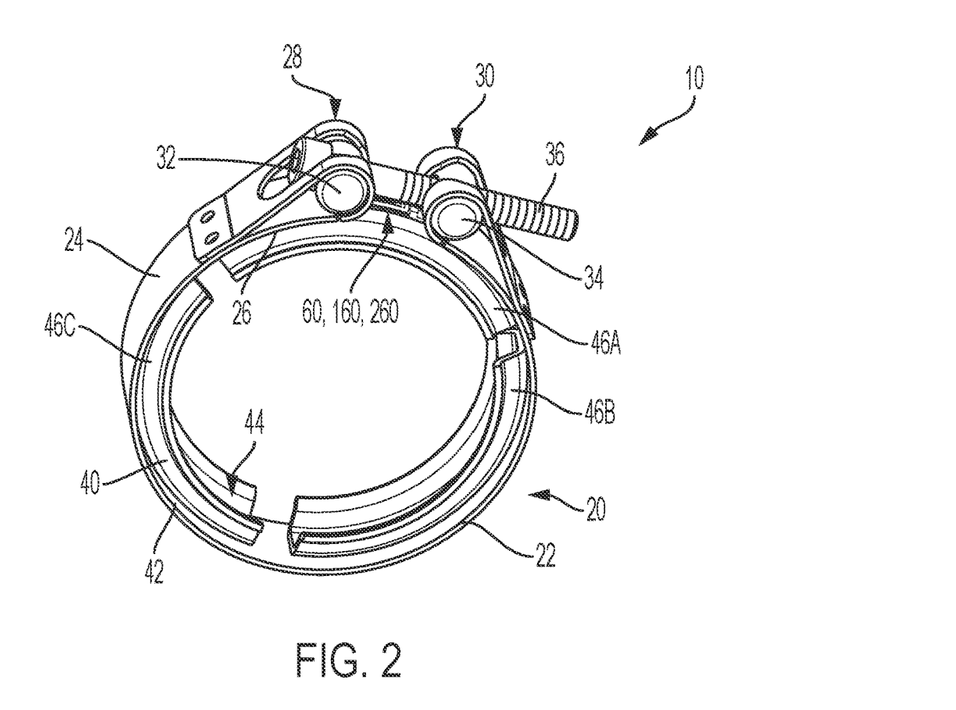
FIG. 2 is a perspective view of the RFID connector shown in FIG. 1, in a locked state.
Figure 3:
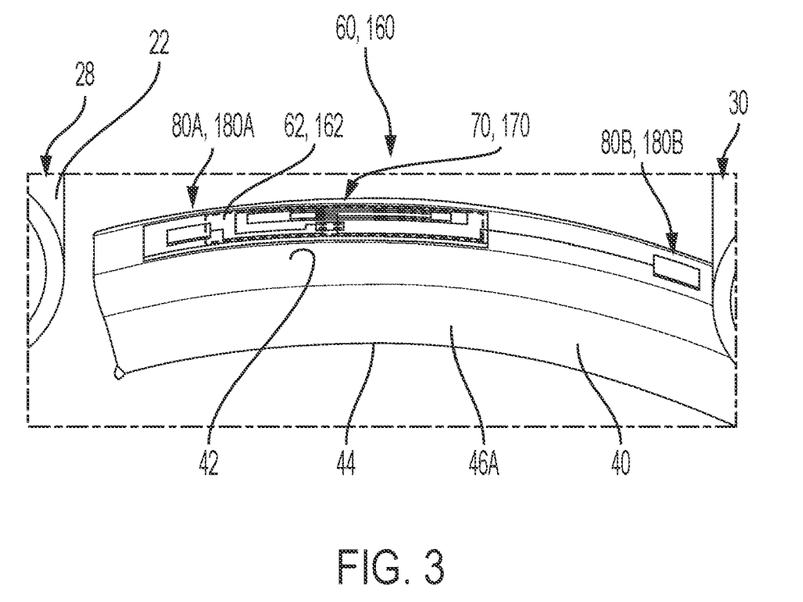
FIG. 3 is a detail view of the RFID connector taken generally along detail 3 in FIG. 1.

Adverting now to the figures, FIG. 1 is a perspective view of RFID connector 10, in an unlocked state. FIG. 2 is a perspective view of RFID connector 10, in a locked state. FIG. 3 is a detail view of RFID connector 10 taken generally along detail 3 in FIG. 1. RFID connector 10 generally comprises connector or clamp 20 and RFID assembly 60, 160, 260. The following description should be read in view of FIGS. 1-3.

Connector 20 comprises component or outer ring or band 22 and component or inner ring 40. Component 22 comprises an outward facing surface, for example, radially outward facing surface 24, an inward facing surface, for example, radially inward facing surface 26, end 28, and end 30. In some embodiments, end 28 and end 30 are operatively arranged to be displaced toward each other in order to decrease the diameter of connector 20 and squeeze or clamp components together (e.g., the ends of two pipes, tubes, or lines). In some embodiments, and as shown, end 28 comprises a loop and is connected to a component or trunnion, for example, slotted trunnion 32, and end 30 comprises a loop and is connected to a component or trunnion, for example, threaded trunnion 34. Screw 36 engages trunnion 32 and trunnion 34 and is operatively arranged to displace trunnion 34 toward and away from trunnion 32 (or operatively arranged to displace trunnion 32 toward and away from trunnion 34). In some embodiments, screw 36 is threaded and extends through a slot or a through-bore in trunnion 32 and threadably engages threaded trunnion 34. As screw 36 is rotated in a first direction, threaded trunnion 34 is displaced toward slotted trunnion 32 (or slotted trunnion 32 is displaced toward threaded trunnion 34). As screw 36 is rotated in a second direction, opposite the first direction, threaded trunnion 34 is displaced away from slotted trunnion 32 (or slotted trunnion 32 is displaced away from threaded trunnion 34). In some embodiments, trunnion 32 is threaded and trunnion 34 is slotted.

Component 40 is connected to and arranged (radially) inward from component 22. In some embodiments, and as shown, component 40 comprises one or more segments, for example, segments 46A-C. In some embodiments, connector 40 only comprises one segment, for example, segment 46A. In some embodiments, connector 20 does not comprise a connector or inner ring, and comprises only connector (i.e., outer ring) 22. Segments 46A-C are connected to radially inward facing surface 26 and are circumferentially spaced there about. Each of segments 46A-C comprises an outward facing surface, for example radially outward facing surface 42, which is connected to radially inward facing surface 26, and an inward facing surface, for example, radially inward facing surface 44. Radially inward facing surface 44 may be linear (e.g., cylindrical) or curvilinear (e.g., U-shaped) in order to clamp or secure two components together. For example, as shown, radially inward facing surface 44 is U-shaped such that two pipe ends having flanges can be secured within the contour of radially inward facing surface 44. However, it should be appreciated that any clamp or connector may be used in place of connector 20, and that the present disclosure should not be limited to only that which is shown in the drawings.

RFID assembly 60, 160, 260 is arranged on a radially outward facing surface of the one or more segments, for example, on radially outward facing surface 42 of segment 46A. RFID assembly 60, 160, 260 comprises at least one contact that is electrically connected to component 22, as will be described in greater detail below. In some embodiments, RFID assemblies 60 and 160 comprise contacts 80A-B and 180A-B, respectively. As best shown in FIG. 3, contact 80B, 180B is electrically connected to radially outward facing surface 42 of segment 46A of component 40. Since segment 46A is also electrically connected to component 22, it follows that contact 80B, 180B is electrically connected to component 22. Contact 80A, 180A is non-electrically connected to radially outward facing surface 42 of segment 46A. As shown, contact 80A, 180A is arranged on insulating layer 62, 162 thereby preventing electrical connection between contact 80A, 180A and segment 46A, and thus component 22, as will be described in greater detail below. As component 22 is tightened (i.e., end 28 is displaced closer to end 30), radially inward facing surface 26 of component 22 contacts and electrically connects to contact 80A, 180A, thereby completing the circuit between contacts 80A, 180A and 80B, 180B. Upon completion of the circuit, RFID tag 70, 170 indicates that the connection is secure.

Figure 4:
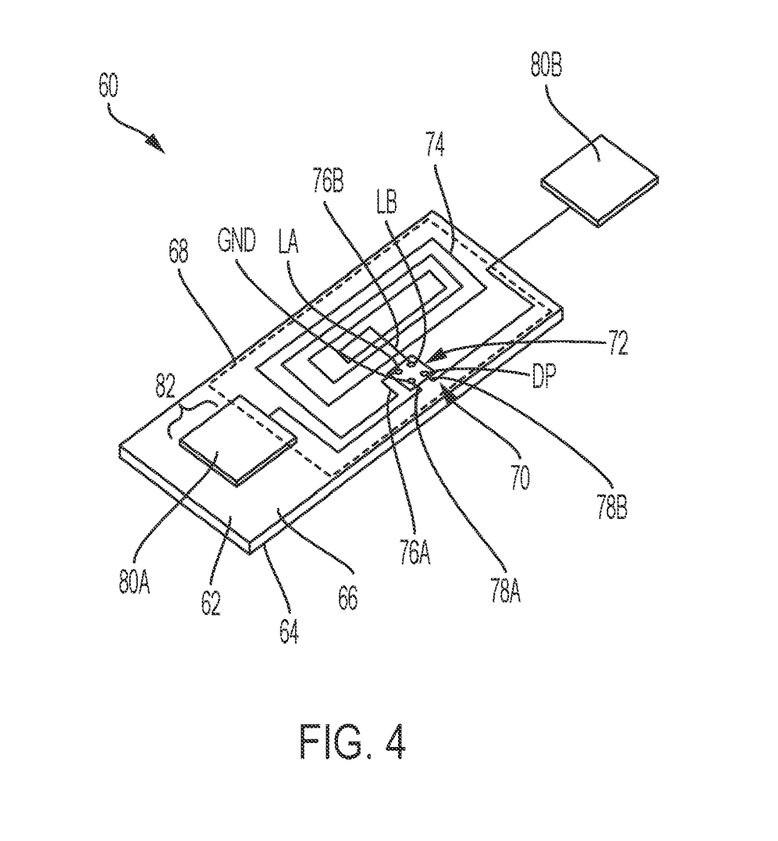
FIG. 4 is a perspective view of a RFID assembly.

FIG. 4 is a perspective view of RFID assembly 60. RFID assembly 60 generally comprises at least one layer (e.g., layer 62), RFID tag 70, and at least one contact (e.g., contact 80A and/or contact 80B). In some embodiments, RFID assembly 60 is a RFID label that is connected to a first component of a connector, wherein the connector is arranged to connect two elements. It should be appreciated that RFID assembly 60 may be used to ensure any type of connection, for example, a fluid connection, a constant-velocity (CV) joint, a trailer hitch connection, electrical connections, etc. The following description should be read in view of FIGS. 1-4.

Layer 62 comprises surface 64 and surface 66 and is operatively arranged to be secured to a component of connector 20, for example, radially outward facing surface 42 of component 40. In some embodiments, surface 64 comprises an adhesive and secures RFID tag 70 and/or contact 80A to connector 20 (e.g., segment 46A). It should be appreciated that layer 62 need not be connected to connector 20 via adhesives, but rather can be connected and/or applied using any other suitable means, for example, string, tape, hook and loop fastener, solder, welding, etc. In some embodiments, layer 62 is an insulator. In an unconnected state, as shown in FIGS. 1 and 3, contact 80A is non-electrically connected to segment 46A and component 22, and contact 80B is electrically connected to segment 46A and component 22.

RFID assembly 60 may further comprise an additional ferrite layer connected to top surface 66 (not shown) operatively arranged as a platform or base for RFID tag 70 and/or contact 80A. In some embodiments, RFID assembly 60 further comprises layer 68. Layer 68 is operatively arranged to cover and protect RFID tag 70. As shown in FIG. 4, layer 68 completely covers RFID tag 70 and at least partially covers contact 80A. However, it is required that at least a portion of contact 80A is exposed, for example, exposed portion 82, such that it is capable of engaging and electrically connecting to end 28 of component 22, as will be described in greater detail below.

RFID tag 70 is arranged on surface 66 and comprises integrated circuit (IC) or chip 72 and antenna 74. In some embodiments, RFID tag 70 comprises a passive RFID tag. In some embodiments, RFID tag 70 comprises an active RFID tag (and further comprises a power source). In some embodiments, RFID tag 70 comprises a semi-passive RFID tag. In some embodiments, RFID tag 70 is preprogrammed such that it transmits information, for example, a unique identification (UID) number, the state of RFID assembly 60 (i.e., open or closed), etc. Antenna 74 is connected at a first end to IC 72 at antenna radio-frequency (RF) input LA, and at a second end to IC 72 at antenna RF input LB, via conductors 76A and 76B, respectively. RFID tag 70 is further connected to contact 80A and contact 80B. Specifically, conductor 78A connects contact 80A with IC 72 at ground pin GND and conductor 78B connects contact 80B with IC 72 at detector pin DP.

Contact 80A is separated from contact 80B. Specifically, contact 80A is arranged on surface 66 of layer 62 and contact 80B is not arranged on layer 62. Contact 80B is arranged on radially outward facing surface 42 and electrically connected to component 40 and component 22 of connector 20. In some embodiments, contact 80B is arranged on radially inward facing surface 26 and electrically connected to component 40 and component 22 of connector 20. It should be appreciated that contact 80B may be connected to component 40 and/or component 22 via any suitable means, for example, adhesives, string, tape, hook and loop fastener, solder, welding, etc. In some embodiments, contacts 80A and 80B are electrical conductors. It should be appreciated that, in the unlocked state, as shown in FIGS. 1 and 3, contact 80B is always electrically connected to component 22 and contact 80A is not electrically connected to component 22. When connector 20 is properly secured, end 28 of component 22 is pulled into engagement and electrical connection with contact 80A. In some embodiments, component 22 and/or component 40 comprises an electrically conductive material (e.g., metal). As such, when end 28 is engaged with contact 80A, component 22 completes the circuit between contacts 80A-B and IC 72 and causes RFID tag 70 to become enabled (i.e., RFID tag 70 is capable of being powered by an electromagnetic field generated by an external device (not shown)) or switch to a closed state (from an open state). Prior to completion of the circuit, namely, electrically connecting contact 80A directly with contact 80B, RFID tag 70 is not enabled (i.e., RFID tag 70 is not capable of being powered by an electromagnetic field generated by the external device) or in some embodiments, it indicates an open status. When the circuit is completed (i.e., component 22 and/or component 40 directly connects contact 80A and contact 80B as shown in FIG. 2), an external device such as a RFID reader will detect that RFID tag 70 is enabled, or in a closed state, thereby indicating that RFID connector 10 is properly connected. Put another way, when RFID tag 70 is enabled, the RFID reader will identify that RFID tag 70 exists and thus determine that RFID connector 10 is properly connected. When the circuit is not completed (i.e., contact 80A is not directly connected to contact 80B), the RFID reader will not detect an enabled RFID tag 70 thereby indicating that RFID connector 10 is not properly connected. Put in yet another way, when RFID tag 70 is disabled, the RFID reader will not identify that RFID tag 70 exists and thus determine that RFID connector 10 is not properly connected.

In some embodiments, RFID tag 70 is always enabled and can be detected and read by a RFID reader regardless of whether contacts 80A and 80B are connected. In such embodiments, when contacts 80A and 80B are not directly connected, for example via component 22 and/or component 40, RFID tag 70 is capable of transmitting, to a RFID reader, certain information. Such information may include, but is not limited to, a UID number (e.g., for the RFID tag, the connector form, etc.), size number, model number, serial number, status of RFID tag 70 (i.e., open or closed), uniform resource locator (URL), station identification (i.e., manufacturing LOT number), date/time stamp, description, etc. Put another way, independent of whether contacts 80A and 80B are connected, RFID tag 70 will always transmit certain data (e.g., a UID number, a status, etc.) provided it is properly functioning. Thus, RFID tag 70 is preprogrammed to always transmit at least a UID number and a status (i.e., open or closed), for example, using hexadecimal data or a value. This is important because it allows the user to scan a given RFID tag to determine if it is properly functioning (i.e., if the RFID tag is properly transmitting data then it is properly functioning) as well as to determine its current state (i.e., open or closed). When contacts 80A and 80B are connected, for example, via component 22 and/or component 40, RFID tag 70 transmits data indicating a closed status. In some embodiments, RFID tag 70 indicates a first value (e.g., a first hexadecimal value) for an open state and a second value (e.g., second hexadecimal value) for a closed state, the second value being different from the first value. It should be appreciated that RFID tag 70 may include any programming suitable for indicating that it is properly functioning and a differentiation between an open state and a closed state, and that the present disclosure should not be limited to just the use of the hexadecimal system.

Figure 5:
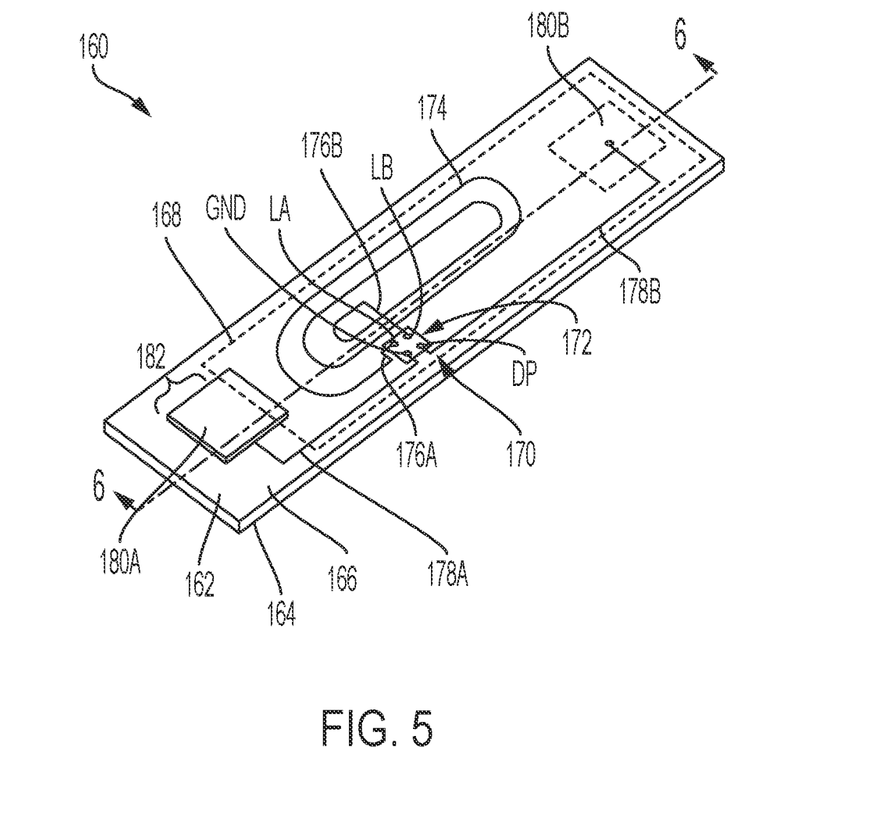
FIG. 5 is a perspective view of a RFID assembly.
Figure 6:
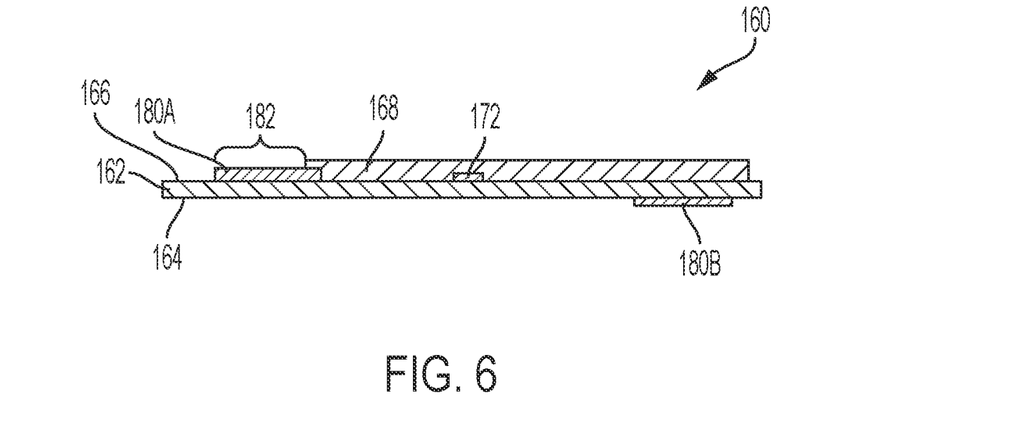
FIG. 6 is a cross-sectional view of the RFID assembly taken generally along line 6-6 in FIG. 5.

FIG. 5 is a perspective view of RFID assembly 160. FIG. 6 is a cross-sectional view of RFID assembly 160 taken generally along line 6-6 in FIG. 5. RFID assembly 160 generally comprises at least one layer (e.g., layer 162), RFID tag 170, and at least one contact (e.g., contact 180A and/or contact 180B). In some embodiments, RFID assembly 160 is a RFID label that is connected to a first component of a connector, wherein the connector is arranged to connect two elements. It should be appreciated that RFID assembly 160 may be used to ensure any type of connection, for example, a fluid connection, a CV joint, a trailer hitch connection, electrical connections, etc. The following description should be read in view of FIGS. 1-6.

Layer 162 comprises surface 164 and surface 166 and is operatively arranged to be secured to a component of connector 20, for example, radially outward facing surface 42 of component 40 (e.g., segment 46A). In some embodiments, surface 164 comprises an adhesive and secures RFID tag 170 and/or contact 180A and/or contact 180B to connector 20. It should be appreciated that layer 162 need not be connected to connector 20 via adhesives, but rather can be connected and/or applied using any other suitable means, for example, string, tape, hook and loop fastener, solder, welding, etc. In some embodiments, layer 162 is an insulator. In an unconnected state, as shown in FIGS. 1 and 3, contact 180A is non-electrically connected to segment 46A and component 22, and contact 180B is electrically connected to segment 46A and component 22.

RFID assembly 160 may further comprise an additional ferrite layer connected to top surface 166 (not shown) operatively arranged as a platform or base for RFID tag 170 and/or contact 180A. In some embodiments, RFID assembly 160 further comprises layer 168. Layer 168 is operatively arranged to cover and protect RFID tag 170 and/or contact 180A. As shown in FIGS. 5-6, layer 168 completely covers RFID tag 170 and at least partially covers contact 180A. However, it is required that at least a portion of contact 180A is exposed, for example, exposed portion 182, such that it is capable of engaging and electrically connecting to end 28 of component 22, as will be described in greater detail below.

RFID tag 170 is arranged on surface 166 and comprises IC or chip 172 and antenna 174. In some embodiments, RFID tag 170 comprises a passive RFID tag. In some embodiments, RFID tag 170 comprises an active RFID tag (and further comprises a power source). In some embodiments, RFID tag 170 comprises a semi-passive RFID tag. In some embodiments, RFID tag 170 is preprogrammed such that it transmits information, for example, a UID number, the state of RFID assembly 160 (i.e., open or closed), etc. Antenna 174 is connected at a first end to IC 172 at antenna RF input LA, and at a second end to IC 172 at antenna RF input LB, via conductors 176A and 176B, respectively. RFID tag 170 is further connected to contact 180A and contact 180B. Specifically, conductor 178A connects contact 180A with IC 172 at ground pin GND and conductor 178B connects contact 180B with IC 172 at detector pin DP.

Contact 180A is separated from contact 180B. Specifically, contact 180A is arranged on surface 166 of layer 162 and contact 180B is arranged on surface 164 of layer 162. Contact 180B is arranged on radially outward facing surface 42 and electrically connected to component 40 and component 22 of connector 20. In some embodiments, contacts 180A and 180B are electrical conductors. It should be appreciated that, in the unlocked state, as shown in FIGS. 1 and 3, contact 180B is always electrically connected to component 22 (through segment 46A) and contact 180A is not electrically connected to component 22. When connector 20 is properly secured, end 28 of component 22 is pulled into engagement and electrical connection with contact 180A. In some embodiments, component 22 and/or component 40 comprises an electrically conductive material (e.g., metal). As such, component 22 completes the circuit between contacts 180A-B and IC 172 and causes RFID tag 170 to become enabled (i.e., RFID tag 170 is capable of being powered by an electromagnetic field generated by an external device (not shown)) or switch to a closed state (from an open state). Prior to completion of the circuit, namely, electrically connecting contact 180A directly with contact 180B, RFID tag 170 is not enabled (i.e., RFID tag 170 is not capable of being powered by an electromagnetic field generated by the external device) or in some embodiments, it indicates an open status. When the circuit is completed (i.e., component 22 and/or component 40 directly connects contact 180A and contact 180B as shown in FIG. 2), an external device such as a RFID reader will detect that RFID tag 170 is enabled, or in a closed state, thereby indicating that RFID connector 10 is properly connected. Put another way, when RFID tag 170 is enabled, the RFID reader will identify that RFID tag 170 exists and thus determine that RFID connector 10 is properly connected. When the circuit is not completed (i.e., contact 180A is not directly connected to contact 180B), the RFID reader will not detect an enabled RFID tag 170 thereby indicating that RFID connector 10 is not properly connected. Put in yet another way, when RFID tag 170 is disabled, the RFID reader will not identify that RFID tag 170 exists and thus determine that RFID connector 10 is not properly connected.

In some embodiments, RFID tag 170 is always enabled and can be detected and read by a RFID reader regardless of whether contacts 180A and 180B are connected. In such embodiments, when contacts 180A and 180B are not directly connected, for example via component 22 and/or component 40, RFID tag 170 is capable of transmitting, to a RFID reader, certain information. Such information may include, but is not limited to, a UID number (e.g., for the RFID tag, the connector, etc.), size number, model number, serial number, status of RFID tag 170 (i.e., open or closed), URL, station identification (i.e., manufacturing LOT number), date/time stamp, description, etc. Put another way, independent of whether contacts 180A and 180B are connected, RFID tag 170 will always transmit certain data (e.g., a UID number, a status, etc.) provided it is properly functioning. Thus, RFID tag 170 is preprogrammed to always transmit at least a UID number and a status (i.e., open or closed), for example, using hexadecimal data or a value. This is important because it allows the user to scan a given RFID tag to determine if it is properly functioning (i.e., if the RFID tag is properly transmitting data then it is properly functioning) as well as to determine its current state (i.e., open or closed). When contacts 180A and 180B are connected, for example, via component 22 and/or component 40, RFID tag 170 transmits data indicating a closed status. In some embodiments, RFID tag 170 indicates a first value (e.g., a first hexadecimal value) for an open state and a second value (e.g., second hexadecimal value) for a closed state, the second value being different from the first value. It should be appreciated that RFID tag 170 may include any programming suitable for indicating that it is properly functioning and a differentiation between an open state and a closed state, and that the present disclosure should not be limited to just the use of the hexadecimal system.

Figure 7:
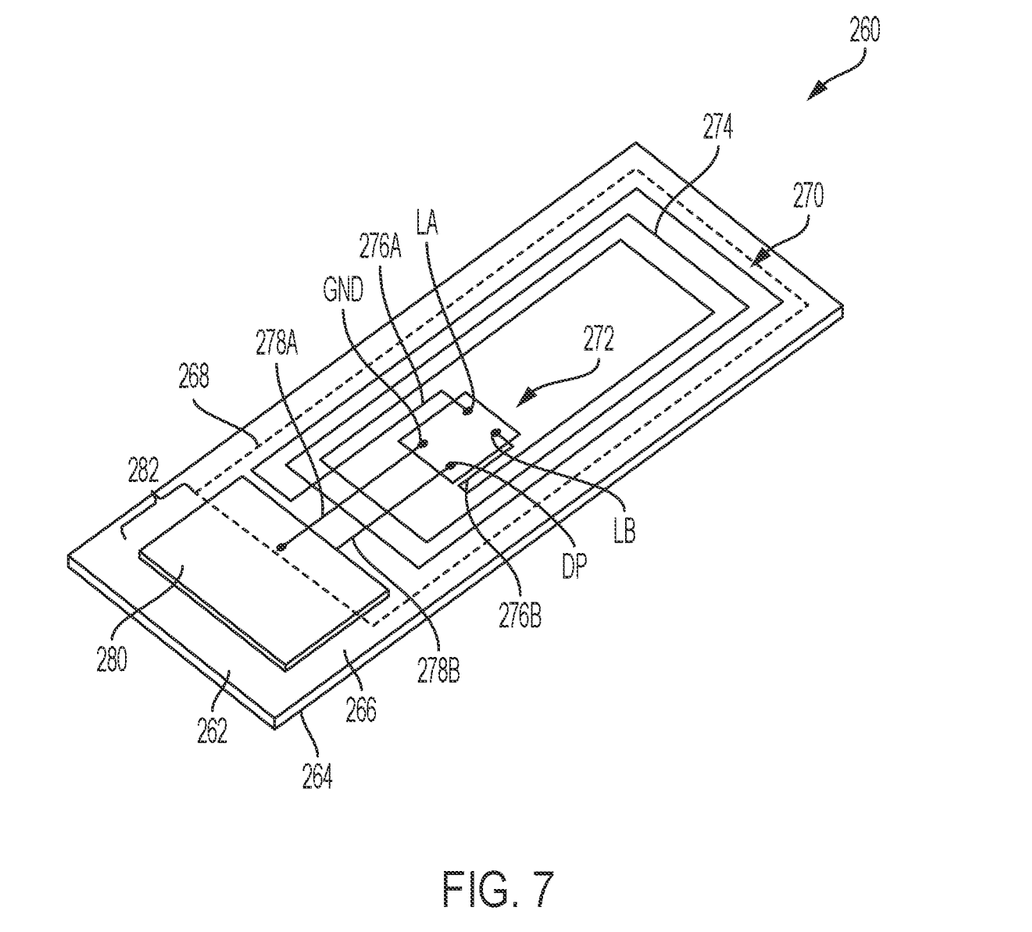
FIG. 7 is a perspective view of a RFID assembly.
Figure 8:
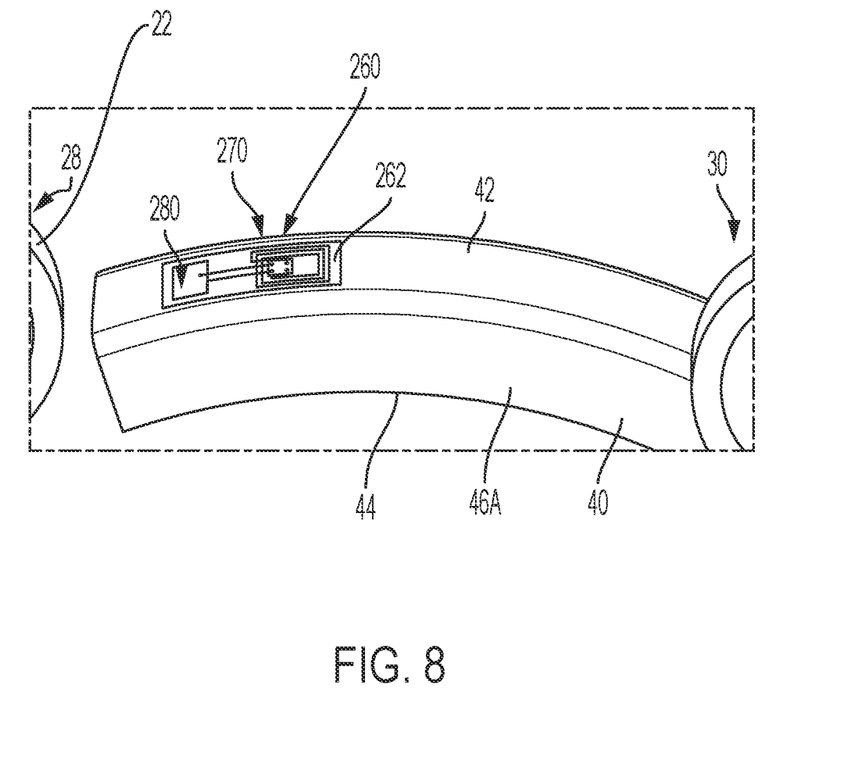
FIG. 8 is a detail view of the RFID connector taken generally along detail 8 in FIG. 1.

FIG. 7 is a perspective view of RFID assembly 260. FIG. 8 is a detail view of RFID connector 10 taken generally along detail 8 in FIG. 1. RFID assembly 260 generally comprises at least one layer (e.g., layer 262), RFID tag 270, and at least one contact (e.g., contact 280). In some embodiments, RFID assembly 260 is a RFID label that is connected to a connector or clamp, wherein the connector or clamp is arranged to connect two elements together. It should be appreciated that RFID assembly 260 may be used to ensure any type of connection, for example, a fluid connection, a CV joint, a trailer hitch connection, electrical connections, etc. The following description should be read in view of FIGS. 1-3 and 7-9B.

Layer 262 comprises surface 264 and surface 266 and is operatively arranged to be secured to a component of connector 20, for example, radially outward facing surface 42 of component 40 (e.g., segment 46A). In some embodiments, surface 264 comprises an adhesive and secures RFID tag 270 and/or contact 280 to connector 20. It should be appreciated that layer 262 need not be connected to connector 20 via adhesives, but rather can be connected and/or applied using any other suitable means, for example, string, tape, hook and loop fastener, solder, welding, etc. In some embodiments, layer 262 is an insulator.

RFID assembly 260 may further comprise an additional ferrite layer connected to top surface 266 (not shown) operatively arranged as a platform or base for RFID tag 270 and/or contact 280. In some embodiments, RFID assembly 260 further comprises layer 268. Layer 268 is operatively arranged to cover and protect RFID tag 270 and/or contact 280. As shown in FIG. 7, layer 268 completely covers RFID tag 270 and at least partially covers contact 280. However, it is required that at least a portion of contact 280 is exposed, for example, exposed portion 282, such that it is capable of engaging and electrically connecting to end 28 of component 22, as will be described in greater detail below.

RFID tag 270 is arranged on surface 266 and comprises IC or chip 272 and antenna 274. In some embodiments, RFID tag 270 comprises a passive RFID tag. In some embodiments, RFID tag 270 comprises an active RFID tag (and further comprises a power source). In some embodiments, RFID tag 270 comprises a semi-passive RFID tag. In some embodiments, RFID tag 270 is preprogrammed such that it transmits information, for example, a UID number, the state of RFID assembly 260 (i.e., open or closed), etc. Antenna 274 is connected at a first end to IC 272 at antenna RF input LA, and at a second end to IC 272 at antenna RF input LB, via conductors 276A and 276B, respectively. RFID tag 270 is further connected to contact 280. Specifically, conductor 278A connects contact 280 with IC 272 at ground pin GND and conductor 278B connects contact 280 with IC 272 at detector pin DP.

Contact 280 is arranged on surface 266 of layer 262. Contact 280 is arranged on radially outward facing surface 42. Contact 280 is operatively arranged to engage with component 22, for example, end 28. In some embodiments, contact 280 is a pressure sensitive contact. When RFID connector 10 is properly connected, end 28 engages contact 280 and applies pressure thereto. In some embodiments, connector 20 comprises a metal. In some embodiments, connector 20 comprises a non-metallic material such as a polymer or an elastomer. It should be appreciated that connector 20 may comprise any material suitable to apply pressure to contact 280. Once a sufficient pressure is applied to contact 280, the circuit is completed between conductors 278A and 278B and IC 272 and causes RFID tag 270 to become enabled (i.e., RFID tag 270 is capable of being powered by an electromagnetic field generated by an external device (not shown)) or indicate a closed state. Prior to completion of the circuit, namely, electrically connecting the ends of conductors 278A and 278B, RFID tag 270 is not enabled (i.e., RFID tag 270 is not capable of being powered by an electromagnetic field generated by the external device) or indicates an open state. When the circuit is completed (i.e., connector 20 applies a sufficient pressure to contact 280 thereby electrically connecting conductor 278A directly with conductor 278B), an external device such as a RFID reader will detect that RFID tag 270 is enabled or in a closed state thereby indicating that RFID connector 10 is properly connected. Put another way, when RFID tag 270 is enabled, the RFID reader will identify that RFID tag 270 exists and thus determine that RFID connector 10 is properly connected. When the circuit is not completed (i.e., the ends of conductors 278A is not directly connected to contact 278B), the RFID reader will not detect an enabled RFID tag 270 thereby indicating that RFID connector 10 is not properly connected. Put in yet another way, when RFID tag 270 is disabled, the RFID reader will not identify that RFID tag 270 exists and thus determine that RFID connector 10 is not properly connected.

Figure 9A:
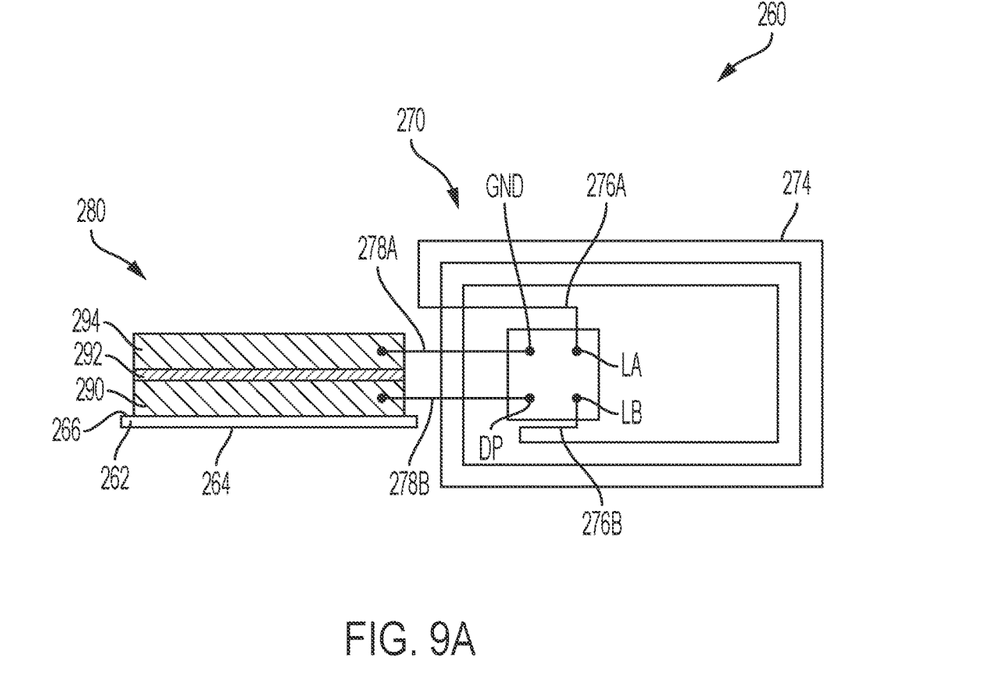
FIG. 9A is a partial cross-sectional schematic view of a RFID assembly in an open state; and, FIG. 9B is a partial cross-sectional schematic view of the RFID assembly shown in FIG. 9A, in a closed state.
Figure 9B:
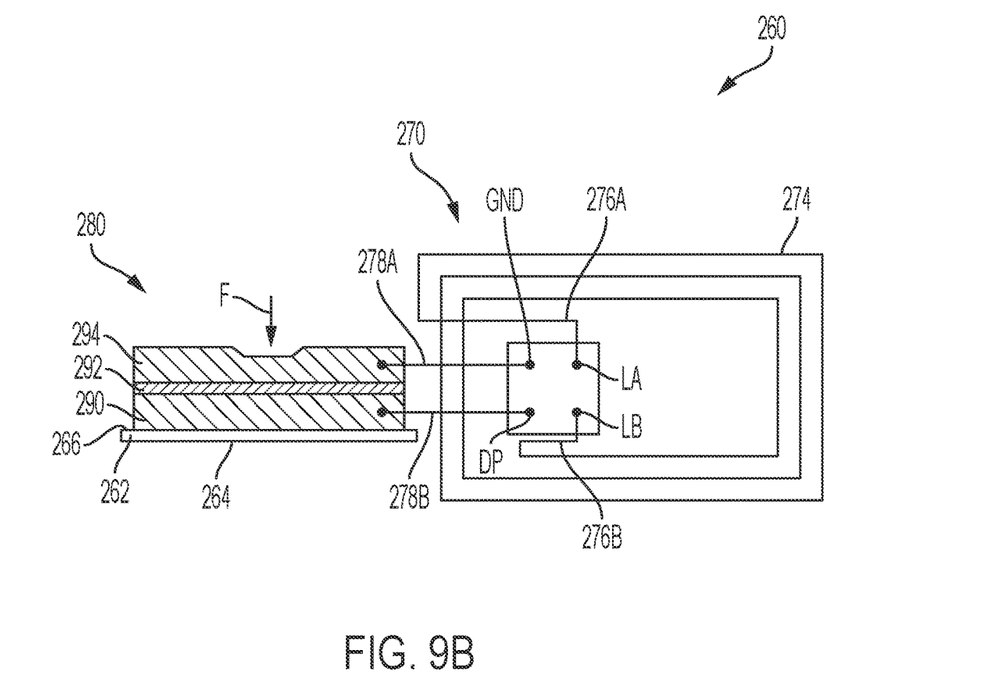

In some embodiments, RFID tag 270 is always enabled and can be detected and read by a RFID reader regardless of whether conductive layers 290 and 294 (i.e., conductors 278A and 278B) are in direct contact. In such embodiments, and as previously described, when conductive layers 290 and 294 (i.e., conductors 278A and 278B) are not directly connected, for example from the force of component 22, RFID tag 270 is capable of transmitting, to a RFID reader, certain information. Such information may include, but is not limited to, a UID number, size number, model number, serial number, status of RFID tag 270 (i.e., open or closed), URL, station identification, date/time stamp, description, etc. Put another way, independent of whether conductive layers 290 and 294 (i.e., conductors 278A and 278B) are connected, RFID tag 270 will always transmit data (e.g., a UID number, a status, etc.) provided it is properly functioning. Thus, RFID tag 270 is preprogrammed to always transmit at least a UID number and a status (i.e., open or closed), for example, using hexadecimal data or a value. This is important because it allows the user to scan a given RFID tag to determine if it is properly functioning (i.e., if the RFID tag is properly transmitting data then it is properly functioning) as well as to determine its current state (i.e., open or closed). When conductive layers 290 and 294 (i.e., conductors 278A and 278B) are connected, for example, by applying a suitable force F to layer 294 via component 22 (e.g., end 28), RFID tag 270 transmits data indicating a closed status. In some embodiments, RFID tag 270 indicates a first value (e.g., a first hexadecimal value) for an open state and a second value (e.g., a second hexadecimal value) for a closed state, the second value being different from the first value. It should be appreciated that RFID tag 270 may include any programming suitable for indicating that it is properly functioning and a differentiation between an open state and a closed state, and that the present disclosure should not be limited to just the use of the hexadecimal system.

FIG. 9A is a partial cross-sectional schematic view of RFID assembly 260 in an open (or disabled) state, in accordance with some embodiments of the present disclosure. It should be appreciated that this is only one embodiment of a pressure sensitive contact, and that various other pressure sensitive contacts that are known in the art or developed in the future may be used. Contact 280 comprises conductive layer 290, insulating layer 292, and conductive layer 294. Conductive layer 290 is arranged on surface 266 of layer 262. In some embodiments, conductive layer 290 is arranged on an additional ferrite layer arranged on surface 266 (not shown). In some embodiments, conductive layer 290 is arranged on radially outward facing surface 42 of segment 46A (i.e., layer 262 is not included). Insulating layer 292 is arranged on top of layer 290. Conductive layer 294 is arranged on top of insulating layer 292. Insulating layer 292 is operatively arranged to separate conductive layers 290 and 294 until a sufficient force F is applied to conductive layer 294, as will be described in greater detail below. Conductor 278A connects ground pin GND with conductive layer 294 and conductor 278B connects detection pin DP with conductive layer 290. In some embodiments, conductor 278A connects ground pin GND with conductive layer 290 and conductor 278B connects detection pin DP with conductive layer 294. As shown in FIG. 9A, conductors 278A and 278B remain unconnected and thus RFID tag 270 will indicate an open state or remains disabled (i.e., a RFID reader would not detect that RFID tag 270 exists). As such, in either case, the RFID reader will indicate that RFID connector 10 is not properly secured.

FIG. 9B is a partial cross-sectional schematic view of RFID assembly 260 shown in FIG. 9A, in a closed (or enabled) state. When a sufficient force F is applied to conductive layer 294, for example via component 22, conductive layer 294 is displaced through insulating layer 292 and contacts conductive layer 290. When conductive layer 294 contacts conductive layer 290, conductors 278A and 278B are electrically connected completing the circuit and RFID tag 270 indicates a closed state or is enabled (i.e., RFID tag 270 is capable of being powered by an electromagnetic field generated by the RFID reader). As such, in either case, the RFID reader will indicate that RFID connector 10 is properly secured. As can be envisioned from the figures, as end 28 is displaced toward end 30, end 28 is forced down onto RFID assembly 260 and applies force F to contact 280, specifically layer 294.

It should be appreciated that the RFID tags and assemblies described herein, for example, RFID tags 70 170, and 270 and RFID assemblies 60, 160, and 260, may utilize any suitable radio frequency range. In some embodiments, RFID tags 70, 170, and 270 comprise low frequency (LF) RFID tags operating in the 30 KHz to 300 KHz range, and have a read range of up to 10 cm. While LF RFID tags have a shorter read range and slower data read rate than other technologies, they perform better in the presence of metal or liquids (which can interfere with other types of RFID tag transmissions). Common standards for LF RFID include ISO 14223 and ISO/IEC 18000-2. In some embodiments, RFID tags 70 170, and 270 comprise high frequency (HF) RFID tags operating in the 3 MHz to 30 MHz range and provide reading distances of 10 cm to 1 m. In such embodiments, RFID tags 70 170, and 270 may even be near-field communication (NFC) tags since NFC technology is based on HF RFID. Common standards for HF RFID include ISO 15693, ECMA-340, ISO/IEC 18092 (for NFC), ISO/IEC 14443A and ISO/IEC 14443 (for MIFARE and other smart card solutions). In some embodiments, RFID tags 70 170, and 270 comprise ultra-high frequency (UHF) RFID operating in the 300 MHz to 2 GHz range and provide reading distances of up to 12 m. A well-known standard for UHF RFID is EPCglobal Gen2/ISO 18000-6C. Furthermore, in some embodiments, a single RFID reader is capable of detecting and receiving data from a plurality of RFID tags, not just one.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 RFID connector
20 Connector or clamp
22 Component or outer ring or band
24 Radially outward facing surface
26 Radially inward facing surface
28 End
30 End
32 Component or trunnion
34 Component or trunnion
36 Screw or connecting member
40 Component or inner ring
42 Radially outward facing surface
44 Radially inward facing surface
46A Segment
46B Segment
46C Segment
60 RFID assembly (or label)
62 Layer
64 Surface
66 Surface
68 Layer
70 RFID tag
72 IC (or chip)
74 Antenna
76A Conductor
76B Conductor
78A Conductor
78B Conductor
80A Contact
80B Contact
82 Exposed portion
160 RFID assembly (or label)
162 Layer
164 Surface
166 Surface
168 Layer
170 RFID tag
172 IC (or chip)
174 Antenna
176A Conductor
176B Conductor
178A Conductor
178B Conductor
180A Contact
180B Contact
182 Exposed portion
260 RFID assembly (or label)
262 Layer
264 Surface
266 Surface
268 Layer
270 RFID tag
272 IC (or chip)
274 Antenna
276A Conductor
276B Conductor
278A Conductor
278B Conductor
280 Contact
282 Exposed portion
290 Layer
292 Layer
294 Layer
LA Antenna RF input
LB Antenna RF input
GND Ground pin
DP Detection pin
F Force

What is claimed is:

1. A radio-frequency identification (RFID) connector, comprising:
a connector, including at least one component including a first end and a second end, the second end being displaceable relative to the first end to tighten and loosen the connector; and
a RFID assembly connected to the connector, the RFID assembly including:
a RFID tag; and
at least one contact arranged on the at least one component and electrically connected to the RFID tag;
wherein:
in an unlocked state of the RFID connector, the RFID tag indicates an open state of the RFID assembly; and
in a locked state of the RFID connector, the RFID tag indicates a closed state of the RFID assembly.

2. The RFID connector as recited in claim 1, wherein the at least one component comprises:
a first component including the first end and the second end; and
a second component, wherein the at least one contact is arranged on the second component.

3. The RFID connector as recited in claim 2, wherein:
in the unlocked state, the first component is not engaged with the at least one contact; and
in the locked state, the first component is engaged with the at least one contact.

4. The RFID connector as recited in claim 2, wherein:
the first component is an outer ring including an inward facing surface; and
the second component is connected to the inward facing surface and includes an outward facing surface, the at least one contact being arranged on the outward facing surface.

5. The RFID connector as recited in claim 4, wherein the second component comprises one or more segments.

6. The RFID connector as recited in claim 1, wherein the at least one contact comprises:
a first contact electrically connected to the at least one component; and
a second contact.

7. The RFID connector as recited in claim 6, wherein:
in the unlocked state, the second contact is not electrically connected to the at least one component; and
in the locked state, the second contact is electrically connected to the at least one component.

8. The RFID connector as recited in claim 1, wherein the at least one contact comprises a pressure sensitive contact.

9. The RFID connector as recited in claim 1, wherein the at least one contact comprises:

a first contact electrically connected to the RFID tag; and a second contact electrically connected to the RFID tag, the second contact being separated from the first contact to form the open state.

10. The RFID connector as recited in claim 9, wherein, in the closed state, the first contact is electrically connected to the second contact.

11. The RFID connector as recited in claim 1, wherein:

the RFID tag comprises an antenna;

in an open state of the RFID tag, the antenna circuit is open; and in a closed state of the RFID tag, the antenna circuit is closed.

12. A radio-frequency identification (RFID) connector, comprising:

a connector, including:
   a first component comprising an inward facing surface, a first end, and a second end; and
   a second component comprising an outward facing surface, the second component connected to the first component; and a RFID assembly, including:
   a RFID tag;
   a first contact electrically connected to the RFID tag and the second component; and
   a second contact electrically connected to the RFID tag and arranged on the outward facing surface of the second component;

wherein:
   in an unlocked state of the RFID connector, the second contact is not electrically connected to the first component; and
   in a locked state of the RFID connector, the second contact is electrically connected to the first component.

13. The RFID connector as recited in claim 12, wherein:

in the unlocked state, the RFID tag indicates an open state of the RFID assembly; and in the locked state, the RFID tag indicates a closed stat of the RFID assembly.

14. The RFID connector as recited in claim 12, wherein the second end is operatively arranged to displace relative to the first end to:

tighten the connector; and removably engage and electrically connect to the second contact.

15. The RFID connector as recited in claim 12, wherein the connector is a clamp.

16. The RFID connector as recited in claim 12, wherein the RFID assembly further comprises a layer, the layer comprising:

a top surface, wherein the second contact and the RFID tag are arranged on the top surface; and a bottom surface.

17. The RFID connector as recited in claim 16, wherein the layer comprises an insulating material and the bottom surface is connected to the outward facing surface.

18. The RFID connector as recited in claim 16, wherein the first contact is arranged on the bottom surface.

19. The RFID connector as recited in claim 13, wherein:

the RFID tag comprises an antenna;

in the open state, the antenna circuit is open; and in the closed state, the antenna circuit is closed.

20. A radio-frequency identification (RFID) connector, comprising:

a connector, including:
   an outer ring comprising an inward facing surface, a first end, and a second end, the second end being displaceable relative to the first end; and
   an inner ring component comprising an outward facing surface, the inner ring component connected to the outer ring; and a RFID assembly arranged on the outward facing surface of the inner ring component, the RFID assembly including:
   a RFID tag;
   a first contact electrically connected to the RFID tag and the outer ring; and
   a second contact electrically connected to the RFID tag;

wherein:
   in an unlocked state of the RFID connector, the second contact is not electrically connected to the outer ring and the RFID tag indicates an open state of the RFID assembly; and
   in a locked state of the RFID connector, the second contact is electrically connected to the outer ring and the RFID tag indicates a closed state of the RFID assembly.

* * * * *